(12) United States Patent
Nagata et al.

(10) Patent No.: US 7,663,998 B2
(45) Date of Patent: Feb. 16, 2010

(54) INFORMATION REPRODUCTION DEVICE AND READ CLOCK MONITORING METHOD

(75) Inventors: Masayoshi Nagata, Tokyo (JP); Takayoshi Chiba, Tokyo (JP); Atsushi Watanabe, Kanagawa (JP)

(73) Assignee: Sony Corporation, Tokyo (JP)

( * ) Notice: Subject to any disclaimer, the term of this patent is extended or adjusted under 35 U.S.C. 154(b) by 590 days.

(21) Appl. No.: 10/556,725

(22) PCT Filed: Mar. 2, 2005

(86) PCT No.: PCT/JP2005/004258

§ 371 (c)(1),
(2), (4) Date: Nov. 14, 2005

(87) PCT Pub. No.: WO2005/091293

PCT Pub. Date: Sep. 29, 2005

(65) Prior Publication Data

US 2006/0239146 A1    Oct. 26, 2006

(30) Foreign Application Priority Data

Mar. 19, 2004    (JP) ............................. 2004-081374

(51) Int. Cl.
*G11B 7/00*    (2006.01)
(52) U.S. Cl. ................. 369/53.34; 369/47.28
(58) Field of Classification Search .................. None
See application file for complete search history.

(56) References Cited

U.S. PATENT DOCUMENTS 6,768,706 B1 *    7/2004    Tonami ................... 369/47.25

FOREIGN PATENT DOCUMENTS

| JP | 61-96571 | 5/1986 |
|---|---|---|
| JP | 3-230619 | 10/1991 |
| JP | 4-295672 | 10/1992 |
| JP | 11-149704 | 6/1999 |
| JP | 2000-286701 | 10/2000 |

* cited by examiner

*Primary Examiner*—Wayne R Young
*Assistant Examiner*—Adam R Giesy
(74) *Attorney, Agent, or Firm*—Oblon, Spivak, McClelland, Maier & Neustadt, L.L.P.

(57) ABSTRACT

An information reproduction device capable of a more appropriate frequency monitoring of a read clock, as compared to conventional devices, is realized. By providing the information reproduction device with a frequency difference detection means which detects a difference in frequencies between a read clock, obtained by applying PLL to a reproduction signal read from a recording medium, and a reference clock; an information processing means which performs signal processing on the reproduction signal and outputs a processing status information indicating whether or not the information processing is performed normally; and a frequency monitoring means which monitors whether or not the frequency of the read clock is normal based on the frequency difference and the processing status information; wherein the frequency monitoring means makes a transition to an OK status which indicates that the frequency of the read clock is normal when the processing status information is indicating a normal status; and makes a transition to a NG status which indicates that the frequency of the read clock is abnormal when the processing status information is indicating an abnormal status and the difference of the frequencies exceeds a first threshold; and returns to an OK status when the difference of the frequencies is below a second threshold during the NG status.

6 Claims, 5 Drawing Sheets

INFORMATION REPRODUCTION DEVICE AND READ CLOCK MONITORING METHOD

TECHNICAL FIELD

The present invention relates to an information reproduction device and a method of monitoring a read clock, which is well suited for application in, for instance, a disk drive device of an optical disk.

BACKGROUND ART

Conventionally, during recording, disk drive devices write data onto an optical disk based on a reference clock (i.e. write clock) which has a predetermined frequency. Disk drive devices are configured so as to generate, during reproduction, using a PLL (Phase Locked Loop), a read clock corresponding to a reproduction RF signal read from the optical disk, and demodulate data by performing signal processing based on the read clock. (For instance, refer to Patent Document 1).

Therefore, in order to have a disk drive device correctly demodulate data, it is required that the frequency of the read clock match the frequency of the write clock. However, a reproduction RF signal may be corrupted due to various causes such as failures or defects of the optical disk, or impact caused to the disk drive device and the like, which make it impossible to perform accurate PLL on the reproduction RF signal, which in turn may cause fluctuations of the frequency of the read clock. In this case, the frequency of the read clock deviates from the frequency of the write clock, and data cannot be normally reproduced.

Thus, disk drive devices are configured so that the frequency difference between a write clock and a read clock is monitored upon reproduction, and when the frequency difference exceeds a predetermined threshold, it is determined that the frequency of the read clock is inappropriate due to some error, and normalization of data reproduction is attempted by executing a retry operation or changing operation modes.

One of the methods of such monitoring of the frequency of the read clock involves monitoring the state of consistency of a pulse based on an edge of an N-divider signal of the write clock and a pulse based on an edge of an N-divider signal of the read clock, and when discrepancies between the two pulses continue for a predetermined number of times, the frequency of the read clock is deemed to be inappropriate and a transition is made to a read clock NG status, (hereinafter simply referred to as a "NG status"), and when matches between the two pulses continue for a predetermined number of times during a NG status, the frequency of the read clock is deemed to have returned to an appropriate condition, and the status is returned to a read clock OK status (hereinafter simply referred to as an "OK status").

Another method of monitoring the frequency of the read clock involves monitoring whether an edge of an N-divider signal of the write clock is within a detection window based on an edge of an N-divider signal of the write clock, and when a condition where the edge is not within the detection window continues for a predetermined number of times a transition is made to a NG status, and when a condition where the edge is within the detection window continues for a predetermined number of times during the NG status, the status is returned to an OK status.

[Patent Document 1] Japanese Patent Laid-Open No. 3-201268.

However, in actuality, there are cases when data is normally processed by circuits in subsequent stages even when the frequency of a read clock deviates and a NG status is determined. For instance, when a temporary deviation of the frequency of a read clock occurs due to causes such as a defective portion of an optical disk being read, a NG status may be determined even though a decoder circuit continues to stably detect a frame sync and there is a possibility that a normal decoding will be performed (excessive NG determination), thereby giving rise to a problem wherein a meaningless retry operation is commenced.

In addition, there was a problem at the disk drive device where, in the event that a reproduction RF signal is corrupted due to causes such as a unrecorded portion of an optical disk being read, in turn causing a PLL to become extremely unstable and the read clock to become temporarily extremely quickened, an edge of the read clock enters each detection window despite the fact that there is a major discrepancy between the frequencies of the read clock and the write clock, and an erroneous determination of an OK status is temporarily made, in turn causing the status to fluctuate between OK statuses and NG statuses within a short period of time (destabilization of status determination), and a stable reproduction operation becomes impossible.

DISCLOSURE OF THE INVENTION

The present invention was made in consideration of the above-described problems, and its object is to provide an information reproduction device and a method of monitoring a read clock which is capable of monitoring a frequency of a read clock in a more appropriate manner as compared to conventional devices and methods.

In order to accomplish the above object, the information reproduction device according to the present invention comprises: a frequency difference detection means which detects a difference in frequencies between a read clock, obtained by applying PLL to a reproduction signal read from a recording medium, and a reference clock; an information processing means which performs signal processing on the reproduction signal and outputs a processing status information indicating whether or not the information processing is performed normally; and a frequency monitoring means which monitors whether or not the frequency of the read clock is normal based on the frequency difference and the processing status information. The frequency monitoring means makes a transition to an OK status indicating that the frequency of the read clock is normal when the processing status information is indicating a normal status, and makes a transition to a NG status indicating that the frequency of the read clock is abnormal when the processing status information is indicating an abnormal status and the difference of the frequencies exceeds a first threshold, and returns to an OK status when the difference of the frequencies is below a second threshold during the NG status.

By assuming an OK status when signal processing is normally performed, and maintaining an OK status when signal processing is not normally performed but the difference of the frequencies is under the first threshold and therefore it is considered that a normalization of the signal processing is possible, and making a transition to a NG status only when signal processing is not normally performed and the difference of the frequencies exceeds the first threshold, a determination is made wherein an operation status of the entire information reproduction device is taken into consideration, thereby preventing excessive NG determination.

Furthermore, according to the present invention, the frequency difference detection means outputs the difference between the number of pulses per a predetermined reference time period of a read clock and a reference clock as a frequency difference, and the frequency monitoring means makes a transition to a NG status when a cumulative value of the difference of the number of pulses during a plurality of reference time periods exceeds a first threshold, and returns to an OK status when the difference of the number of pulses during a single reference time period is lower than a second threshold during a NG status.

Upon determination of a, transition to a NG status, by performing the determination based on a cumulative value of the difference of the number of pulses during a plurality of reference time periods, a transition to a NG status is made only when a frequency fluctuation occurs for an extended period of time, and therefore short-term frequency fluctuations are ignored to prevent excessive NG determination.

In addition, upon determination of a transition from a NG status to an OK status, by performing the determination based on a difference of the number of pulses during a single reference time period, precise determination is achieved by instantly detecting a normalization of the frequency of a read clock.

According to the present invention, by performing a frequency determination wherein the operation status of the entire information reproduction device is taken into consideration, excessive NG determination is prevented to achieve a more appropriate monitoring of the frequency of a read clock.

BEST MODE FOR CARRYING OUT THE INVENTION

A preferred embodiment will be described below in detail with reference to the accompanying drawings.

(1) Overall Configuration of a Disk Drive Device

Figure 1:
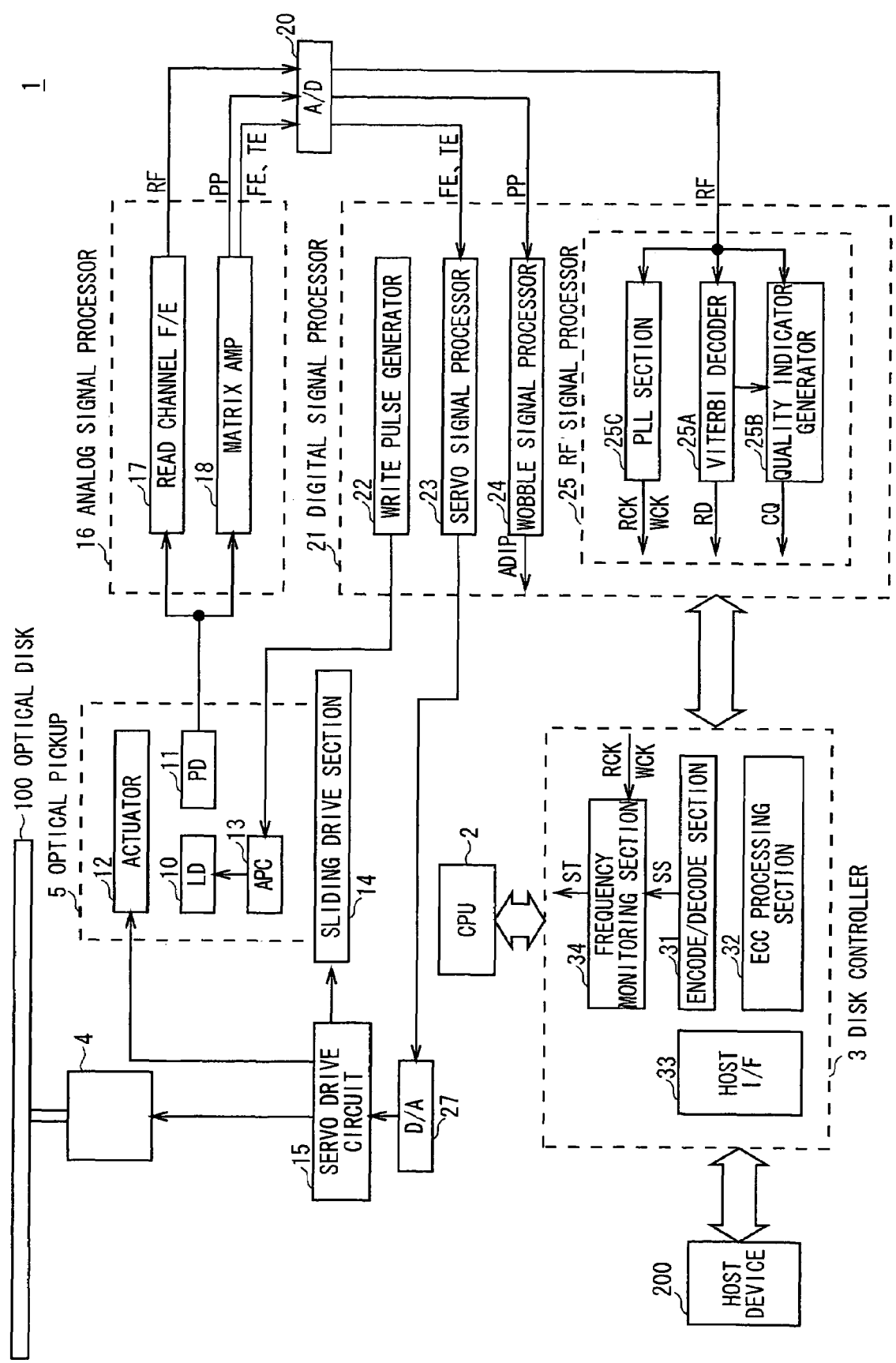
FIG. 1 is a block diagram showing an overall configuration of a disk drive device.

In FIG. 1, reference numeral 1 shows an overall configuration of a disk drive device as an information reproduction device, which is configured so that a CPU 2 integratively controls, via a disk controller 3, the entirety of the disk drive device 1. The disk drive device 1 operates in response to a read/write command supplied from a host device 200, and is configured so that it performs recording and reproduction of data on an optical disk 100 which is a recording medium.

The optical disk 100 is mounted on a turntable, not shown, and when accessing (recording and reproducing) data, the optical disk 100 is rotary-driven by a spindle motor 4 which is a drive means. Data recorded on the optical disk 100 and ADIP (Address in Pre Groove) information by a wobbling group is read by an optical pickup 5 which is an accessing means.

The optical pickup 5 comprises a laser diode 10 which is a light source, a photo detector 11 which detects reflected light, a biaxial actuator 12 which holds an objective lens which becomes an output terminal for a laser, an APC (Auto Power Control) circuit 13 which performs output control of the laser diode 10, and an optical system, not shown, which irradiates a recording face of the disk with laser via the objective lens, and guides the reflected light to the photo detector 11.

The biaxial actuator 12 holds an objective lens so that the objective lens is movable in a tracking direction and a focusing direction. In addition, a sliding drive section 14 drives the entire optical pickup 5 in a reciprocating motion in a radial direction of the disk, in response to the control of a servo driving circuit 15.

The photo detector 11 comprises a plurality of photo diodes, and each photo diode respectively receives reflected light from the optical disk 100 and performs photoelectric conversion, thereby generating received light signals corresponding to the amount of light received and supplies the signals to an analog signal processor 16.

A read channel front end 17 of the analog signal processor 16 generates a reproduction RF signal from the received light signal, and inputs it to an analog-digital converter 20. Meanwhile, a matrix amp 18 performs a matrix operation on the respective received light signals from each photo diode, and generates a focus error signal FE and a tracking error signal TE for servo control, as well as a push-pull signal PP which is an information of a wobbling group, and inputs these signals to the analog-digital converter 20.

The analog-digital converter 20 digitally converts the reproduction RF signal, the focus error signal FE, the tracking error signal TE and the push-pull signal PP, and then inputs the results to a digital signal processor 21.

The digital signal processor 21 comprises a write pulse generator 22, a servo signal processor 23, a wobble signal processor 24 and a RF signal processor 25.

The wobble signal processor 24 decodes a push-pull signal PP and extracts ADIP information comprising an address, physical format information and the like, and supplies the ADIP information to the CPU 2.

The servo signal processor 23 generates various servo drive signals of focus, tracking, slide and spindle based on the focus error signal FE and the tracking error signal TE, and supplies the servo drive signals to the servo drive circuit 15 via a digital-analog converter 27. The servo signal processor 23 also supplies, in response to instructions from the CPU 2, servo drive signals which instruct operations such as focus search, track jump and seek to the servo drive circuit 15. The servo drive circuit 15 in turn drives the biaxial actuator 12, the sliding drive section 14 and the spindle motor 4 based on the servo drive signals.

Meanwhile, data encoded by a RLL (Run Length Limited) (1, 7) code based on the RLL coding method is stored on the optical disk. The RF signal processor 25 performs a Viterbi decoding process on a reproduction RF signal comprising a (1, 7) code read from the optical disk, and obtains reproduction data.

A PLL portion 25C of the RF signal processor 25 performs PLL on the reproduction RF signal to generate a read clock RCK. At the same time, the PLL portion 25C generates a write clock WCK which becomes a reference clock for writing of data.

A Viterbi decoder 25A of the RF signal processor 25 sequentially selects maximum likelihood conditions estimated from condition transition patterns established by the RLL encoding method, based on the value of a reproduction RF signal (reproduction signal value) of each timing determined according to the read clock RCK. The Viterbi decoder 25A then generates reproduction data RD based on the selected series of condition data, and supplies the same to the disk controller 3.

At the same time, a quality indicator generator 25B of the RF signal processor 25 obtains an amplitude reference value acxxx comprising a theoretical value of an ideal reproduction RF signal which has no amplitude fluctuation, based on the maximum likelihood conditions selected by the Viterbi decoder 25A. The quality indicator generator 25B then calculates the mean value of difference values e[t] between reproduction signals cxxx of the reproduction signal RF for each sample time and the amplitude reference value acxxx.

The mean value of the difference values e[t] corresponds to the error between an ideal waveform and an actual waveform of a reproduction RF signal, and indicates the degree of quality of the reproduction RF signal. The quality indicator generator 25B outputs the mean value as a quality indicator value CQ which indicates the quality of the reproduction RF signal.

Figure 2:
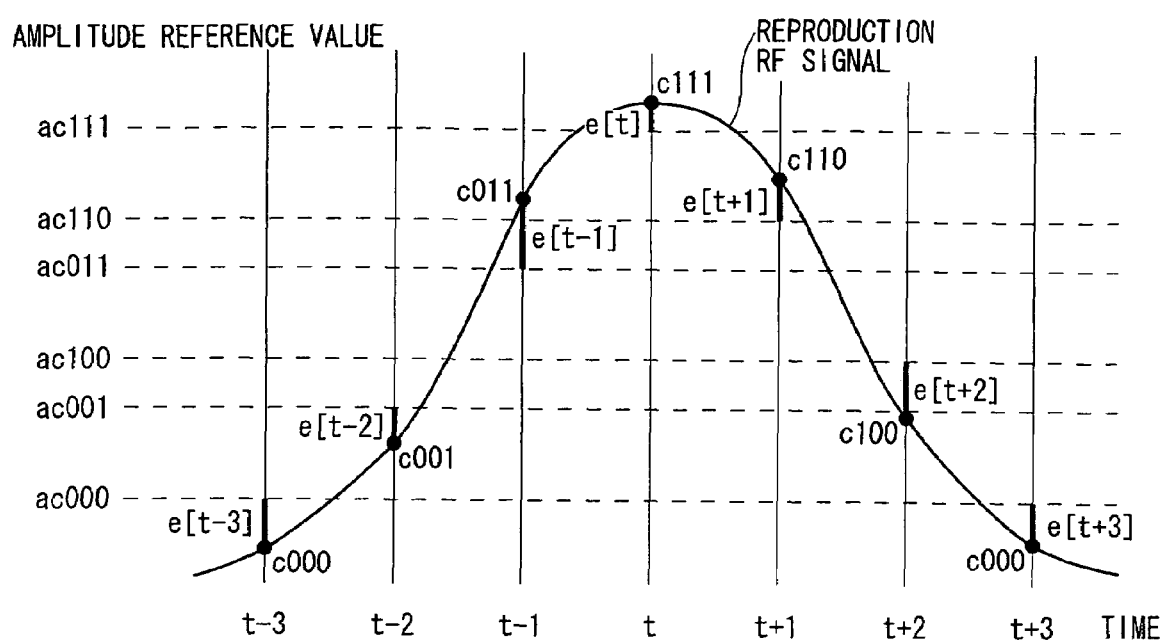
FIG. 2 is a characteristic curve diagram used to describe an amplitude reference value and a reproduction signal value.

For instance, as shown in FIG. 2, assuming that the dashed lines ac000, ac001, ac011, ac111, ac110, ac100 and ac000 are respectively the amplitude reference values for the sample times of t−3, t−2, t−2, t, t+1, t+2 and t+3, and the respective reproduction signal values for each sample time are C000, c001, co011, c111, c110, c100and C000, the respective difference values for each sample time are e[t−3]=ac000-c000, e[t−2]=ac001-c001, e[t−1]=ac011-c011, =ac111-c111, e[t+1]=ac110-c110, e[t+2]=ac100-c100, and e[t+3]=ac000-c000, respectively indicated as heavy solid lines. The quality indicator generator 25B calculates the quality indicator value CQ using the next formula.

$$CQ=(e[t-3]+e[t-2]+e[t-1]+e[t]+e[t+1]+e[t+2]+e[t+3])/7 \quad (1)$$

The disk controller 3 comprises an encode/decode section 31, an ECC (Error Correcting Code) processing section 32, and a host interface 33.

During reproduction, the disk controller 3 performs a decoding process at the encode/decode section 31 on reproduction data supplied from the RF signal processor 25, and then performs an error correction process at the ECC processing section 32, and finally transmits the results to an external host device 200 (for example, a personal computer) via the host interface 33.

The encode/decode section 31 of the disk controller 3 extracts subcode information and address information, as well as management information and additional information, from the information obtained by the decoding process, and supplies such information to the CPU 2.

The CPU 2 executes recording operations on the optical disk 100 in response to write commands from the host device 200.

During recording, the disk controller 3 adds error correction codes to recording data supplied from the host device 200 at the ECC process section 32, and after performing RLL coding to the recording data at the encode/decode section 31 to encode to a RLL (1, 7) code, supplies the results to the write pulse generator 22 of the digital signal processor 21.

The write pulse generator 22 performs processing such as waveform shaping on the recording data to generate laser modulation data, and supplies the generated laser modulation data to the APC circuit 13. The APC circuit 13 drives the laser diode 10 in response to the laser modulation data, and performs writing of data onto the optical disk 100.

(2) Status Determination of the Read Clock at the Disk Drive Device

In addition to the above configuration, the frequency monitoring section 34 of the disk controller 3 constantly monitors, during data reproduction, the frequency difference between the read clock RCK and the write clock WCK which is a reference frequency, and based on the frequency difference, supplies the CPU 2 with a status signal ST which indicates the result of a determination on whether the frequency of the read clock RCK is within tolerance. When the status signal ST indicates a NG status, the CPU 2 judges that some kind of failure has occurred in the reproduction operation, causing a fluctuation of the frequency of the read clock RCK, and a normal reproduction process has not been performed, and attempts normalization of the data reproduction by accordingly executing retry operations or changing operation modes.

In this situation, if status determination is performed based solely on the frequency difference between the read clock RCK and the write clock WCK, as is conventional, problems such as an excessive NG determination or destabilization of status determination may occur. Therefore, in the disk drive device 1 according to the present invention, a more stable status determination, as compared to conventional methods, is achieved by taking into consideration the operational status of the signal processing circuit in subsequent stages.

Figure 3:
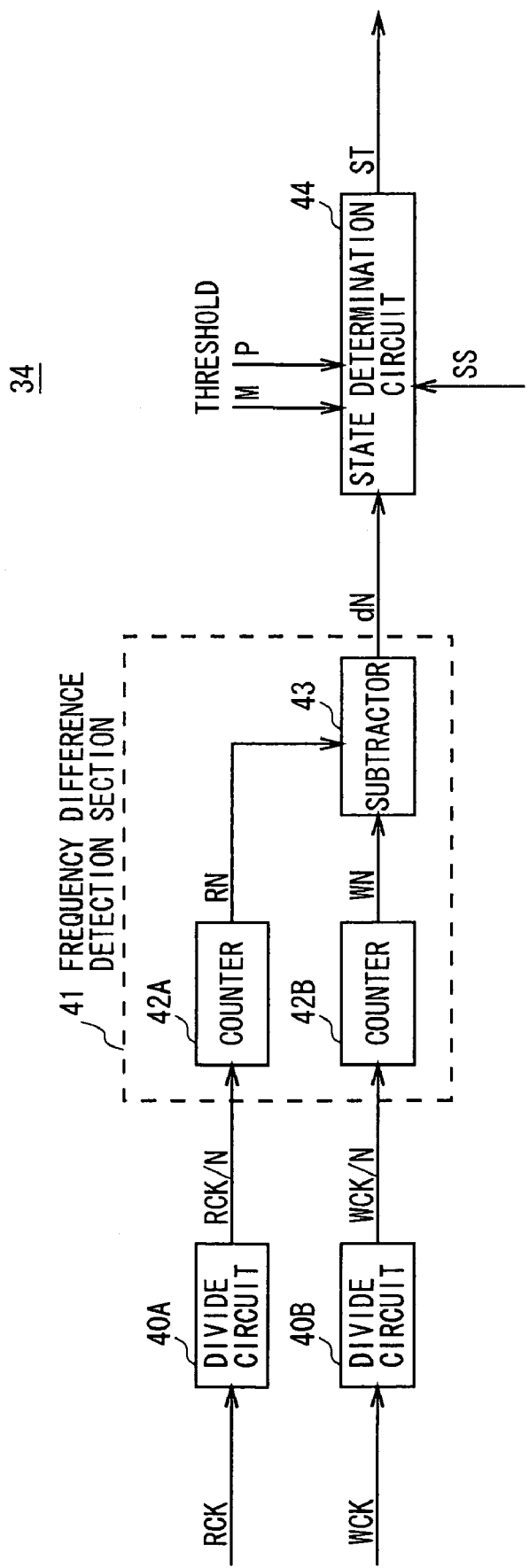
FIG. 3 is a block diagram showing a configuration of a frequency monitoring section.

As shown in FIG. 3, the frequency monitoring section 34 respectively N-divides the read clock RCK and the write clock WCK supplied from the RF signal processor 25 by respectively using divider circuits 40A and 40B to generate a N-divide read clock RCK/N and a N-divide write clock WCK/N, and inputs the same to a frequency difference detection section 41.

A counter 42A of the frequency difference detection section 41 counts per frame the number of pulses of the N-divide read clock RCK/N, and supplies the count value as a read clock count value RN to a subtractor 43. Likewise, a counter 42B counts per frame the number of pulses of the N-divide write clock WCK/N, and supplies the count value as a write clock count value WN to the subtractor 43.

The subtractor 43 subtracts the write clock count value WN from the read clock count value RN to calculate a difference value. The difference value is proportional to the difference between the frequencies per frame of the read clock RCK and the write clock WCK. The subtractor 43 supplies the difference value as a count difference value dN to a state determination circuit 44. Meanwhile, the encode/decode section 31 (FIG. 1) of the disk controller 3 supplies the state determination circuit 44 a frame sync detection signal SS as a processing status information which indicates whether a frame sync is stably detected during a demodulation process.

Figure 4:
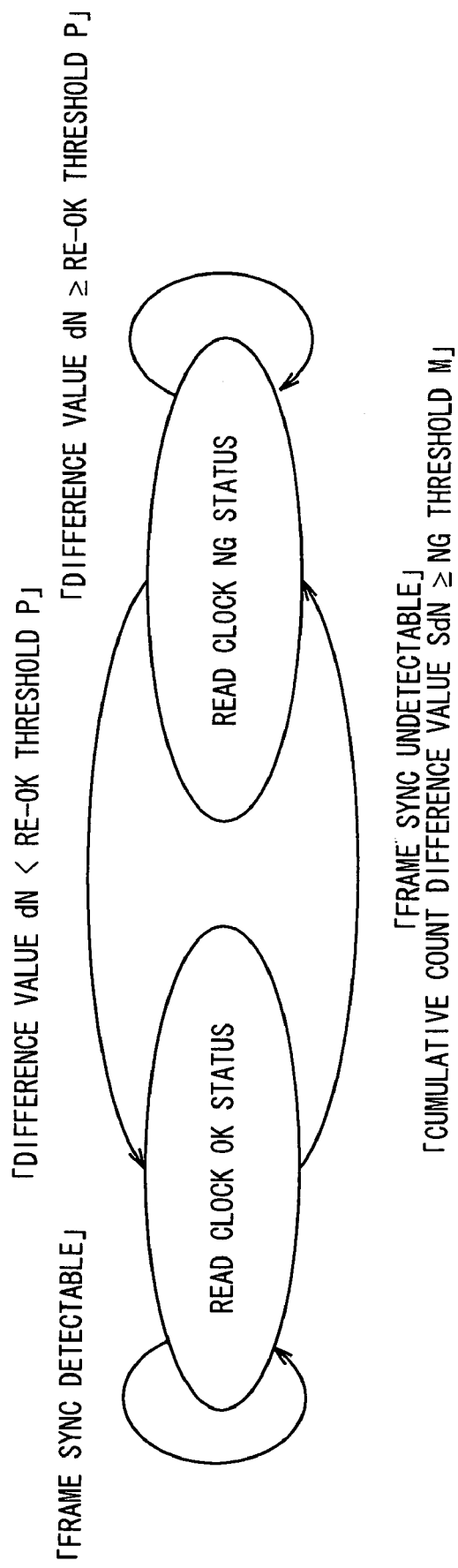
FIG. 4 is a state transition diagram used to describe a status determination of a read clock.

The state determination circuit 44 calculates a cumulative count difference value SdN which is a cumulative value of the last n frames (for instance, the last 5 frames) of the count difference value dN. Then, the state determination circuit 44 performs status determination based on a state transition diagram shown in FIG. 4, using the cumulative count difference value SdN, the count difference value dN and the frame sync detection signal SS.

The state determination circuit 44 monitors the signal level of a frame sync detection signal SS during a normal read clock OK status (hereinafter simply referred to as an "OK status"), and when the signal level of the frame sync detection signal SS is "Hi" which indicates that a frame sync is stably detected, it is judged that signal processing is normally performed and the status remains at an OK status. On the other hand, when the signal level of the frame sync detection signal SS during an OK status is "Lo", indicating that a frame sync is not stably detected, and the cumulative count difference value SdN exceeds a NG threshold M as a first threshold, it is judged that signal processing is not normally performed and that the frequency of the read clock RCK is inappropriate, and a transition is made to a read clock NG status (hereinafter simply referred to as a "NG status").

In addition, the state determination circuit 44 monitors the count difference value dN during a NG status, and when the count difference value dN exceeds a re-OK threshold P as a second threshold, the state determination circuit 44 judges that the frequency of the read clock RCK is still inappropriate and remains at the NG status. On the other hand, when the count difference value dN falls below the re-OK threshold P, it is judged that the frequency of the read clock RCK has returned to an appropriate condition, and the status returns to an OK status.

As described, the state determination circuit 44 uses the detection condition of a frame sync as a chief determination element for determining transition from an OK status to a NG status, and as long as a frame sync is detected, or in other words, as long as there is a possibility that signal processing (decode processing) can be normally performed, maintains an OK status. Only when a frame sync is not detected, and the cumulative count difference value SdN exceeds a NG threshold M, a transition is made to a NG status. In this case, by making the cumulative count difference value SdN of a plurality of frames, instead of the per-frame count difference value dN, a determination element as a condition of transition to a NG status, short-term frequency fluctuations are ignored, and a transition to a NG status is made only when a frequency fluctuation occurs over a plurality of frames for a long period of time.

In addition, by using the per-frame count difference value dN as a determination element for the determination of a transition from a NG status to an OK status, the state determination circuit 44 promptly returns the status to an OK status when the frequency of the read clock RCK is normalized. This allows the state determination circuit 44 to prevent unnecessary state transitions while promptly detecting the normalization of the read clock RCK, thereby enabling precise status determination.

Furthermore, by setting the re-OK threshold P more stringently than the NG threshold M, a more precise status determination is achieved. Since the cumulative count difference value SdN, which is the comparative value of the NG threshold M, is a cumulative value over n frames; an example would be P<M/n. This achieves a more stringent determination of a transition to an OK status from a NG status, and allows a return to an OK status only when the read clock RCK is positively normalized.

Figure 5:
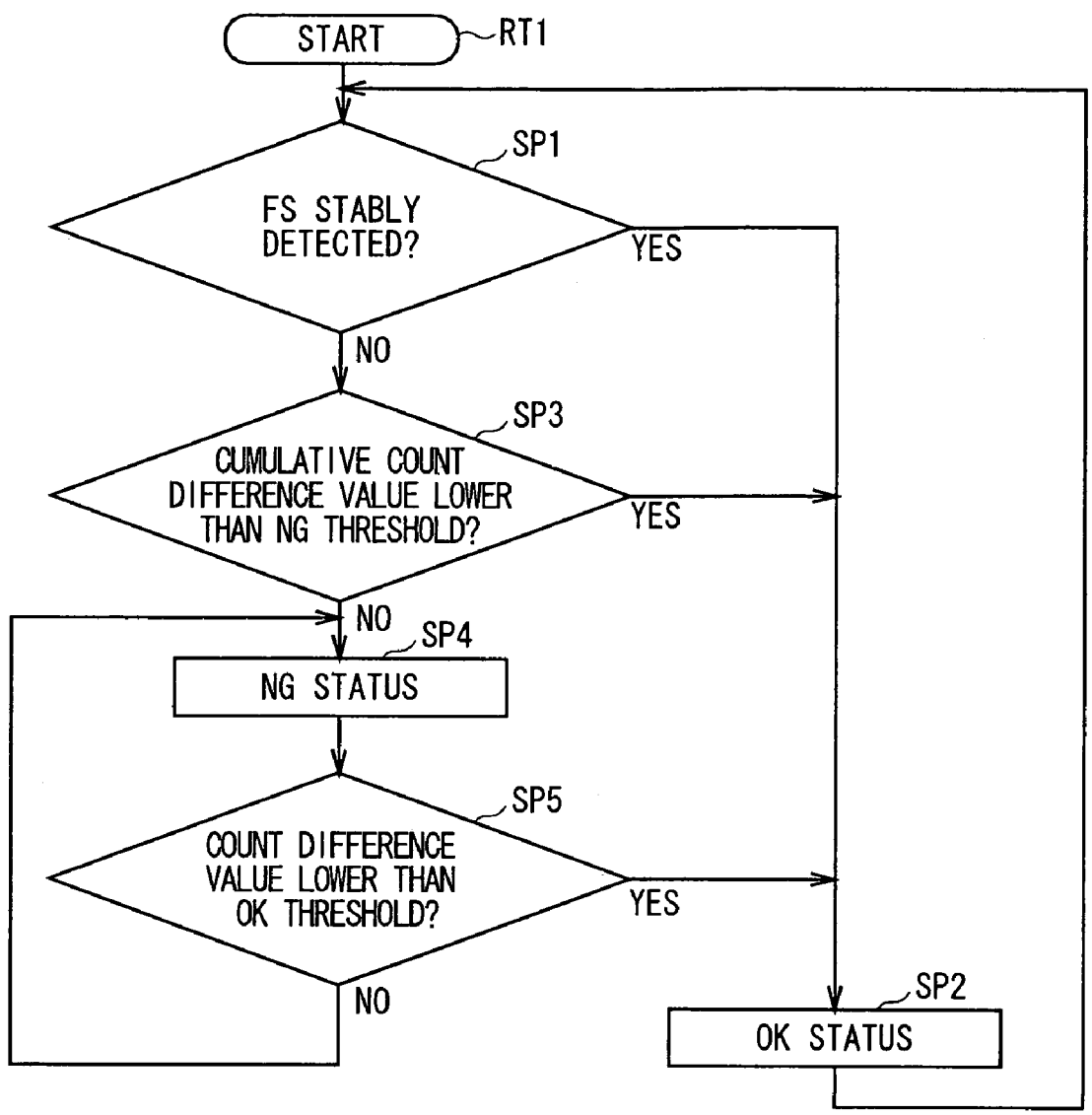
FIG. 5 is a flow chart of procedures in status determination processing.

Next, the above-described procedures of the status determination process of the read clock RCK will now be described in detail with reference to the flow chart shown in FIG. 5.

The state determination circuit 44 of the frequency monitoring section 34 starts the initiation step of the status determination process procedure routine RT1 and proceeds to step SP1 to determine whether a frame sync is stably detected based on a signal level of the frame sync detection signal SS. In step SP1, a "Hi" signal level of the frame sync detection signal SS indicates that a frame sync is stably detected. The state determination circuit 44 then proceeds to step SP2 to restore the status to an OK status, and returns to step SP1.

In contrast, when the signal level of the frame sync detection signal SS in step SP1 is "Lo", this indicates that a frame sync is not stably detected, and the state determination circuit 44 then leaps to step SP3.

In step SP3, the state determination circuit 44 compares the cumulative count difference value SdN with the NG threshold M. When the cumulative count difference value SdN is below the NG threshold M in step SP3, this indicates that the frequency of the read clock RCK is within tolerance even though a frame sync is not stably detected. In this case, the state determination circuit 44 returns to step SP2 to make the status an OK status, and then returns to step SP1.

In contrast, when the cumulative count difference value SdN exceeds the NG threshold M in step SP3, this indicates that a frame sync is not stably detected and the frequency of the read clock RCK is beyond tolerance. In this case, the state determination circuit 44 proceeds to step SP4 to make the status a NG status, and then proceeds to the next step SP5.

In step SP5, the state determination circuit 44 compares the count difference value dN with the re-OK threshold P. When the count difference value dN is below the re-OK threshold P in step SP5, this indicates that the frequency of the read clock RCK has returned to within tolerance. In this case, the state determination circuit 44 jumps to step SP2 to make the status an. OK status, and then returns to step SP1.

In contrast, when the count difference value dN is below the re-OK threshold P in step SP5, this indicates that the frequency of the read clock RCK is still beyond tolerance. In this case, the state determination circuit 44 proceeds to step SP4 to maintain a NG status.

(3) Operation and Advantages

In the above configuration, when performing status determination of the read clock RCK during data reproduction, the state determination circuit 44 of the disk drive device 1 first determines the detection condition of a frame sync by the encode/decode section 31, based on the frame sync detection signal SS. When a frame sync is being detected, the state determination circuit 44 judges that the frequency of the read clock RCK is normal and reproduction is performed without incidence, and determines an OK status.

In addition, when a frame sync is not detected, the state determination circuit 44 compares the cumulative count difference value SdN with the NG threshold M. When the cumulative count difference value SdN is below the NG threshold M, the state determination circuit 44 judges that the frequency of the read clock RCK is within tolerance even though a frame sync is not detected, and that there is a possibility of a frame sync being re-detected if reproduction operation is continued, and therefore maintains an OK status. In contrast, when the cumulative count difference value SdN exceeds the NG threshold M, the state determination circuit 44 judges that a frame sync is not detected and the frequency of the read clock RCK is beyond the frequency tolerance over an extended period of time, and that a frame sync cannot be re-detected even when reproduction operation is continued, and therefore makes a transition to a NG status.

As described above, by having the state determination circuit 44 maintain an OK status as long as a frame sync is detected, or in other words, as long as signal processing is normally performed, and make a transition to a NG status only when no frame sync is detected and the cumulative count difference value SdN exceeds the NG threshold M, a status determination which takes into consideration the reproduction operation of the entire disk drive device 1 is achieved, thereby preventing excessive NG determination.

Furthermore, when the count difference value dN falls below a re-OK threshold P during a NG status, the state determination circuit 44 judges that the frequency of the read clock RCK has returned to within tolerance, and returns the status to an OK status.

In this case, by having the state determination circuit 44 perform status determination based on the per-frame count difference value dN, and by setting the re-OK threshold P more stringently than the NG threshold M, an immediate return to an OK status is achieved only when the read clock RCK is positively normalized.

Moreover, by performing a read clock determination based on a count difference value dN which is a difference value of the number of pulses of the N-divide read clock RCK/N and the number of pulses of the N-divide write clock WCK/N, erroneous determination in cases wherein a PLL becomes extremely unstable and the read clock RCK becomes extremely fast, as known to have occurred with conventional frequency monitoring methods which detect edges of a read clock RCK using detection windows, may be eliminated. By positively detecting a difference of frequency of a read clock RCK, a more appropriate read clock determination is achieved.

According to the above-described configuration, by performing a status determination which takes into consideration the reproduction operation of the entire disk drive device 1, excessive NG determination may be prevented and an immediate return to an OK status is achieved only when the read clock RCK is positively normalized, thereby achieving a more appropriate read clock determination.

(4) Other Embodiments

Incidentally, while the above-described embodiment uses a count difference value dN for the determination of transition from a NG status to an OK status, and uses a cumulative count difference value SdN for the determination of transition from an OK status to a NG status, the present invention is not limited to this feature, and the count difference value dN may be used for the determination of transition from an OK status to a NG status as well.

In addition, while the above-described embodiment describes a case wherein the present application is applied to a disk drive device which performs reproduction on an optical disk, the present invention is not limited to this feature, and the present invention may be applied to information reproduction devices which perform reproduction on various recording medium such as a magneto-optic disk, a magnetic disk or a magnetic tape.

INDUSTRIAL APPLICABILITY

The present invention is applicable to disk drive devices of optical disks.

Description of Symbols

1 . . . DISK DRIVE DEVICE,
2 . . . CPU,
3 . . . DISK CONTROLLER,
4 . . . SPINDLE MOTOR,
5 . . . OPTICAL PICKUP,
16 . . . ANALOG SIGNAL PROCESSOR,
21 . . . DIGITAL SIGNAL PROCESSOR,
25 . . . RF SIGNAL PROCESSOR,
25A . . . VITERBI DECODER,
25B . . . QUALITY INDICATOR GENERATOR,
34 . . . FREQUENCY MONITORING SECTION,
44 . . . STATE DETERMINATION CIRCUIT,
100 . . . OPTICAL DISK

The invention claimed is:

1. An information reproduction device, comprising:
a frequency difference detection means for detecting a difference in frequencies between a read clock, obtained by applying phase locked loop (PLL) to a reproduction signal read from a recording medium, and a reference clock;
an information processing means for performing signal processing on the reproduction signal and outputs a processing status information indicating whether or not the information processing is performed normally; and
a frequency monitoring means for monitoring whether or not the frequency of the read clock is normal based on the frequency difference and the processing status information; the frequency monitoring means includes a state determination means for calculating a cumulative count difference value, said frequency monitoring means makes a transition to an OK status indicating that the frequency of the read clock is normal when the processing status information is indicating a normal status based on the cumulative count difference value being lower than an OK status threshold; said frequency monitoring means makes a transition to a NG status indicating that the frequency of the read clock is abnormal when the processing status information is indicating an abnormal status based on the cumulative count difference value exceeding an NG threshold, and returns to an OK status when the cumulative count difference value is below an OK threshold during the NG status.

2. The information reproduction device according to claim 1, further comprising:
the frequency difference detection means outputs the difference between the number of pulses per a predetermined reference time period of the read clock and the reference clock as the frequency difference.

3. A read clock monitoring method, comprising:
a frequency difference detection step which detects a difference in frequencies between a read clock, obtained by applying phase locked loop (PLL) to a reproduction signal read from a recording medium, and a reference clock;
an information processing step which performs signal processing on the reproduction signal and outputs a processing status information indicating whether or not the information processing is performed normally;
a frequency monitoring step which monitors whether or not the frequency of the read clock is normal based on the frequency difference and the processing status information; the frequency monitoring step includes calculating a cumulative count difference value by a state determination circuit, the frequency monitoring step further includes making a transition to an OK status indicating that the frequency of the read clock is normal when the processing status information is indicating a normal status based on the cumulative count difference value being lower than an OK status threshold, making a transition to a NG status indicating that the frequency of the read clock is abnormal when the processing status information is indicating an abnormal status based on the cumulative count difference value exceeding an NG threshold, and returning to an OK status when the cumulative count difference value is below an OK threshold during the NG status.

4. The read clock monitoring method according to claim 3, further comprising:
the frequency difference detection means outputs the difference between the number of pulses per a predetermined reference time period of the read clock and the reference clock as the frequency difference.

5. An information reproduction device, comprising:
a frequency difference detection device configured to detect a difference in frequencies between a read clock, obtained by applying phase locked loop (PLL) to a reproduction signal read from a recording medium, and a reference clock;

an information processing device configured to perform signal processing on the reproduction signal and outputs a processing status information indicating whether or not the information processing is performed normally; and a frequency monitoring device configured to monitor whether or not the frequency of the read clock is normal based on the frequency difference and the processing status information; the frequency monitoring device includes a state determination circuit for calculating a cumulative count difference value, said frequency monitoring device makes a transition to an OK status indicating that the frequency of the read clock is normal when the processing status information is indicating a normal status based on the cumulative count difference value being lower than an OK status threshold; said frequency monitoring device makes a transition to a NG status indicating that the frequency of the read clock is abnormal when the processing status information is indicating an abnormal status based on the cumulative count difference value exceeding an NG threshold, and returns to an OK status when the cumulative count difference value is below an OK threshold during the NG status.

6. The information reproduction device according to claim 5 further comprising:

the frequency difference detection device outputs the difference between the number of pulses per a predetermined reference time period of the read clock and the reference clock as the frequency difference.

* * * * *